(12) United States Patent
Eidelman

(10) Patent No.: US 7,410,131 B2
(45) Date of Patent: * Aug. 12, 2008

(54) PULSED DETONATION ENGINES FOR REACTION CONTROL SYSTEMS

(75) Inventor: Shmuel Eidelman, Rockville, MD (US)

(73) Assignee: Science Applications International Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/532,163

(22) Filed: Sep. 15, 2006

(65) Prior Publication Data

US 2008/0099627 A1 May 1, 2008

Related U.S. Application Data

(63) Continuation of application No. 10/796,279, filed on Mar. 10, 2004, now Pat. No. 7,278,611.

(60) Provisional application No. 60/320,001, filed on Mar. 11, 2003.

(51) Int. Cl.
*B64G 1/40* (2006.01)

(52) U.S. Cl. ............. 244/171.1; 244/164; 60/247; 60/39.38; 60/39.76

(58) Field of Classification Search ............ 244/171.1, 244/172.2, 164, 169; 60/247, 39.38, 39.39, 60/39.4, 39.76, 39.77, 39.78, 39.79, 39.8, 60/39.81
See application file for complete search history.

(56) References Cited

OTHER PUBLICATIONS

Eidelman, Shmuel; Sharov, Dmitri; and Book, David; "Aerothermodynamics of Pulsed Detonation Engines," Apr. 6, 2000, Presented at 36th Annual Meeting, Cocoa Beach, FL, 1999, SAIC, pp. 1 to 10.
Eidelman, Shmuel; Sharov, Dmitri; Book, David: Science Applications Inc McLean Va, Equipment and Supplies: Air Breathing (Unconventional), "Aerothermodynamics of Pulsed Detonation Engines,", http://www.stormingmedia.us/01/0155/A015504.html.
Eidelman, Shmuel, et al, "Pulsed Detonation Engine Experiental and Theoretical Review," AIAA/SAE/ASME; pp. 857-865; www.fas.org/irp/mystery/pde.htm.
Eidelman, Shmuel; Sharov, Dmitri; Book, David; Apr. 6, 2000; 20020078304 Science Applications, Inc., McLean, VA USA, Scientific and Technical Aerospace Reports, vol. 40, Nov. 1, 2002, p. 20.
DuPont Engineering Polymers Products—Vespel® ; http://www.dupont.com/vespel/.
Claims from co-pending application filed Dec. 9, 2003 (U.S. Appl. No. 10/730,020).
www.aardvark.co.nz/pjet/pde.shtml.
After Combustion: Detonation! By Jim Kelly in Popular Science Aug. 2003.

*Primary Examiner*—Timothy D. Collins
(74) *Attorney, Agent, or Firm*—Banner & Witcoff, Ltd.

(57) ABSTRACT

Pulsed detonation engines (PDEs) are adapted for use in reaction control systems (RCS), such as thrusters for orbital correction and control (e.g., for earth-orbiting satellites), divert thrust generation and control for space-based interceptor devices, and for missile trajectory correction and motion control. According to one aspect of the invention, PDEs are adapted for motion control of so-called "kill vehicles," which are small devices, typically launched from satellites, for strategic missile defense.

12 Claims, 7 Drawing Sheets

Detonation Wave Structure

Force on the Thrust Wall

PULSED DETONATION ENGINES FOR REACTION CONTROL SYSTEMS

CROSS REFERENCE TO RELATED APPLICATION

This application is a continuation of application Ser. No. 10/796,279, filed Mar. 10, 2004, which claims benefit under 35 U.S.C. § 119(e) to Application No. 60/320,001, filed Mar. 11, 2003, the disclosures of which are hereby incorporated by reference in their entireties.

STATEMENT OF FEDERALLY SPONSORED RESEARCH

This invention was made pursuant to Contract No. W9113M-04-C-0032, U.S. Space and Missile Defense Command, and therefore the U.S. Government may have certain rights in the invention.

FIELD OF THE INVENTION

The present invention is directed to pulsed detonation engines, and more particularly to pulsed detonation engines adapted for use in reaction control systems.

DESCRIPTION OF RELATED ART

Reaction control systems (RCS) are conventionally used to correct the orbit or otherwise maneuver a spacecraft or rocket. Examples of reaction control systems include attitude control systems (ACS) and divert engines. The ability to deliver very small thrust impulses is very important for accurate and efficient control of rocket or spacecraft motion.

In conventional rocket engines, reactive materials are injected into a combustion chamber in which the materials react at high pressure and high temperature in a continuous flow process. After reaction in the combustion chamber, the reaction products expand through a converging/diverging nozzle, reaching high velocities thereby generating thrust. In general, the efficiency of the conventional rocket engine is a function of the temperature in the combustion chamber. Because temperatures in the combustion chamber often are higher than 2000° C., the structural elements (e.g., combustion chamber, nozzles, etc.) generally are made from materials having very high thermal stability, such as refractory metal alloys and metal/ceramic composites. Such highly thermally stable materials are expensive, leading to high costs for the rocket systems. In addition, the need to raise the temperature in the combustion chamber before engine operation leads to an increase in minimum thrust pulse duration and engine response time. In small conventional rocket engines, the minimum thrust pulse duration usually is more than 20 msec. Together these factors negatively affect the controlling capability of the engine, limiting its effectiveness in reaction control systems.

In a pulsed detonation engine (PDE), the intermittent mode of operation enables thrust to be produced without the need for pre-heating the engine volume. Thrust is produced when reactive materials injected into the detonation chamber are ignited and detonated, producing high pressure/high temperature detonation products in the detonation chamber. Because the detonation phase of the PDE cycle is followed by injection of relatively low-temperature reactive materials, the detonation chamber is cooled by the injection of the fresh reactive materials. It would be desirable to develop PDEs adapted for providing efficient, high performance and cost-effective thrust generation in reaction control systems.

SUMMARY OF THE INVENTION

The pulsed detonation engines (PDEs) of the present invention are adapted for use in reaction control systems (RCS), such as thrusters for orbital correction and control (e.g., for earth-orbiting satellites), divert thrust generation and control for space-based interceptor devices, and for missile trajectory correction and motion control. According to one aspect of the invention, PDEs are adapted for motion control of so-called "kill vehicles," which are small devices, typically launched from satellites, for missile interception and neutralization (sometimes referred to as strategic missile defense or "Star Wars"). The PDEs of the present invention employ one or more of the features as described herein to provide high performance and effective reaction control systems.

According to one aspect, a reaction control system for controlling motion of a spacecraft or other vehicle is provided. The reaction control system comprises at least one pulsed detonation engine comprising one or more propellant valves, an igniter, a detonation chamber, and a nozzle. The pulsed detonation engine(s) is/are adapted to controllably ignite detonation of a propellant to generate thrust in a predetermined vector for controlling motion of the spacecraft or other vehicle.

According to another aspect, a method of controlling motion of a spacecraft or other vehicle with a reaction control system is provided. The method comprises generating thrust in a predetermined vector by controllably igniting detonation of a propellant in at least one pulsed detonation engine in the reaction control system.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION OF THE INVENTION

Figure 1:
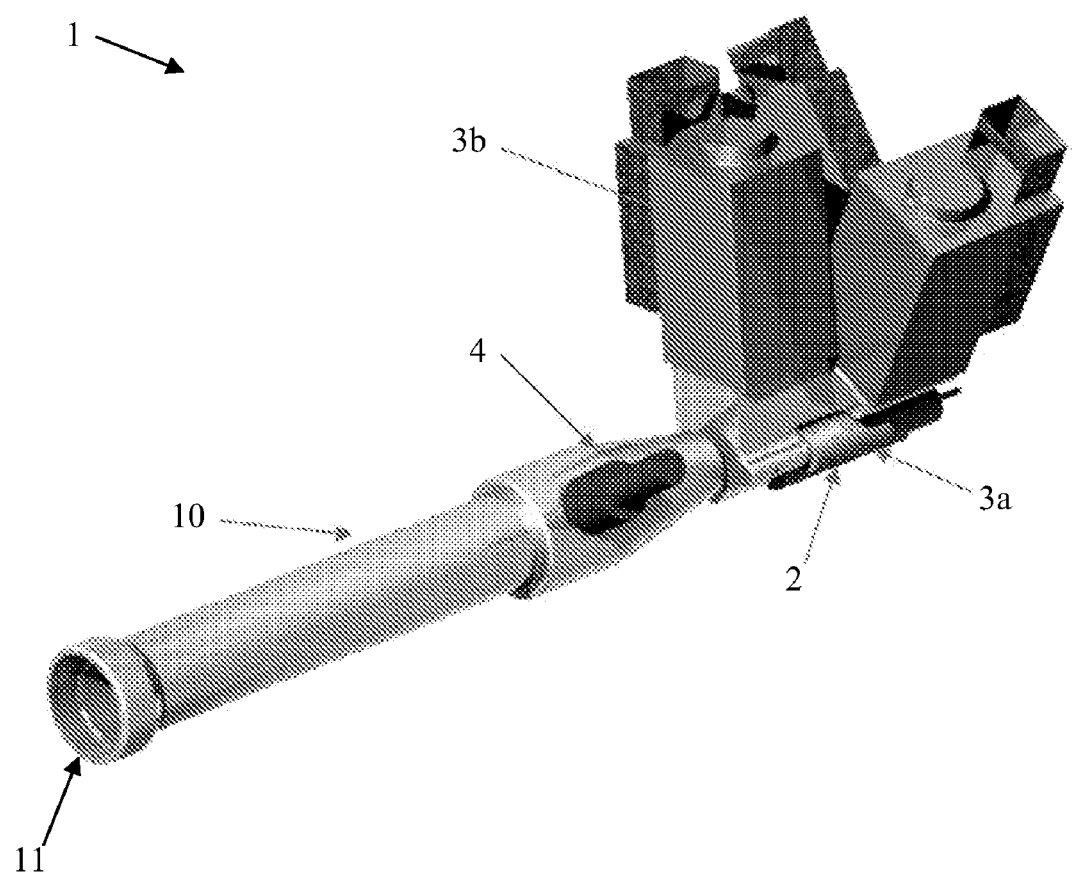
FIG. 1 is a schematic illustration of a pulsed detonation engine for a reaction control system in accordance with one embodiment of the present invention.

The pulsed detonation engine (PDE) of the present invention operates by intermittent injection and detonation, thereby producing thrust without requiring that the engine volume be pre-heated prior to operation, as is required for operation of conventional rocket engines. The intermittent injection of the relatively low-temperature reactants cools the engine volume between detonations, leading to only a gradual temperature rise during engine operation. Because only short intervals of operation are needed for many reaction control system applications, excessive temperatures can be avoided. For many applications, this may eliminate the need for the use of expensive materials in engine construction, such as refractory metal alloys and metal/ceramic composites as typically are used in conventional rocket engines.

The interval of operation (i.e., the amount of time that the intermittent injection and detonation process occurs without interruption) for the PDE of the present invention can be suitably selected to facilitate motion control needed for a particular application. Depending on such factors as the extent of motion correction needed and the mass of the vehicle, for example, the interval of operation may be very short (e.g., one second or less) or significantly longer, for example in the case of auxiliary thrust generation. There is no particular minimum interval of operation contemplated; a very short interval of operation at a high frequency, for example, may be useful to generate a sufficient amount of thrust needed for a particular application. The interval of operation can be as long as necessary to provide the requisite thrust, but of course should not result in engine overheating or failure.

The operation of PDEs in RCS is a function of orbit or trajectory correction that is required by the control system. For some orbit correction maneuvers, the PDEs may be required to generate single impulses of thrust every hour or once per day, for example, where other applications may require the PDE to operate at a given frequency without interruption for 60 seconds, for example, to facilitate a rapid change in trajectory.

The operational frequency of the PDE can vary over a wide range. By way of example, the frequency may range from about 0.001 to 1,000 Hz, and often ranges from about 1 to 500 Hz. The minimum frequencies referenced above are merely illustrative. It is possible, for example, that a given orbit correction may be accomplished with a single pulse produced once per year. Because higher frequencies translate to shorter cooling periods between detonations, higher frequencies tend to result in faster rates of engine temperature increase, which may in turn limit the maximum interval of operation. At lower frequencies, adequate cooling may occur between detonations so as to permit indefinite intervals of operation (e.g., not limited by temperature increases). Optionally, the frequency can be varied during a given interval of operation. For example, the PDE may operate initially at a lower frequency which is gradually increased during the interval of operation. This can permit accurate and rapid correction of spacecraft motion, for example, while avoiding over-correction or unwanted oscillation of the spacecraft.

Particularly when operating at higher frequencies, it is possible that detonation products produced during a given detonation cycle will still be present in the detonation chamber at the time propellant is injected for the next detonation cycle. The high-temperature detonation products potentially can ignite the injected propellant prematurely. This can lead to a continuous reaction (effectively combustion) which generally is undesirable. To avoid unintended self-ignition of the propellant, water or other inert fluid can be injected into detonation chamber to flush the chamber before each cycle or as otherwise may be needed.

According to another aspect of the invention, the PDE employs intermittent injection and detonation with controlled injection times. The controlled injection times usually range from 0.01 to 1,000 msec, more often from about 0.1 to 10 msec. Short injection times permit the detonable mixture to rapidly fill the detonation chamber, which makes operation at higher frequencies possible. The controlled injection time can be suitably selected in accordance with such parameters as the operational frequency, propellant type and phase, and propellant loading density, to meet the needs of a particular application. It should be understood that the controlled injection times indicated above are merely exemplary and not limiting. It is contemplated that in some applications, for instance, a significantly longer injection time may be employed. For example, if only infrequent operation of the PDE is needed, a propellant may be provided by slowly decomposing water to provide a hydrogen/oxygen propellant.

It may be advantageous to briefly delay ignition following injection of the detonable mixture. The delay can permit better dispersion of the detonable mixture in the detonation chamber and mixing of propellant components when bi-propellant mixture is used. Also, ignition can be delayed to allow better condition of mixture initiation in the vicinity of the igniter. Following the completion of injection, ignition can be delayed from 0 to about 100 msec, more usually from about 0.1 to about 10 msec. Preferably, excessive delay periods are avoided because some or all of the injected detonable mixture may escape from the detonation chamber. In addition, longer delay periods will limit the range of operation frequencies, which are intrinsically limited by the total time of injection and ignition.

FIG. 1 illustrates the components of a pulsed detonation engine 1 in accordance with one embodiment of the present invention. The engine 1 includes a detonation chamber 10 and a nozzle 11. The nozzle 11 may be a diverging nozzle, as illustrated in FIG. 1, or may have any other suitable geometric configuration, such as cylindrical, conical, converging-diverging, and the like. A set of electronically controlled propellant valves 3a, 3b and an integrated injection/mixing head 2 are provided for controlling flow of propellant injected into the detonation chamber 10. The injected propellant forms a detonable mixture that fills the detonation chamber 10. A suitable igniter 4, such as a spark plug, laser, pyrotechnic device, etc., is provided in the detonation chamber 10 to ignite the detonable propellant mixture, producing detonation products. As shown in FIG. 1, the igniter 4 can be located proximate to the propellant valves 3a, 3b. Alternatively, the igniter 4 can be somewhat spaced from the propellant injection point, e.g., by from about 0.1 to 10 cm, at some point along the detonation chamber 10 wall. Varying the position of the igniter 4 permits some control over propagation of the detonation wave and may help maintain containment of the detonation products.

The detonation reaction produces a brief period of extremely high temperature and high pressure inside the detonation chamber 10. Typical detonation temperatures are on the order of 4000 K and pressures on the order of 20-40 atmospheres. Detonation pressure is a direct function of propellant density in the detonation chamber and can reach 20,000 atmospheres, for example, if the initial average density is about 1 g/cc.

The dimensions of the PDE as well as its individual components may vary over a wide range depending on the requirements of a particular application, and the present invention should not be construed as being limited to any particular dimensions or geometrical configurations. By way of example, the length of the PDE may range from about 5 to about 100 mm, more preferably from about 5 to about 55 mm. The diameter of the detonation chamber 10 may range from about 0.01 mm to 10 mm. These dimensions should be regarded as exemplary and not limiting. It is contemplated that devices having significantly smaller or significantly larger dimensions can be made and used in accordance with the principles of the present invention. In addition, the detonation chamber may be non-cylindrical, i.e., may have a non-circular and/or variable cross-section. Because temperatures of the engine can be kept moderate, as described herein, the geometry of the engine is not limited to cylindrical configurations that traditionally have been required to avoid overheating and dimensional failure. The geometry of the engine instead can be selected to most effectively adapt to the geometry of the controlled vehicle, to most effectively generate the required thrust vectors, or for other considerations.

In one embodiment, a solid body houses a plurality of pulsed detonation engines formed as channels through the solid body. The geometry of the solid body can be of any suitable configuration. Solid bodies in the form of a cylinder or ring may be advantageous by providing the capability of generating thrust in a wide variety of directions, which provides a high degree of vector control. In some cases, full detonation velocities can be achieved in channels of only about 0.5 cm in length. The body can be constructed of any suitable material, including lightweight materials, such as light metals, composites, ceramics, or plastics. Depending on the dielectric properties of the material used, a dielectric or electrode pin(s) may be installed along the walls of the detonation chambers.

Figure 2:
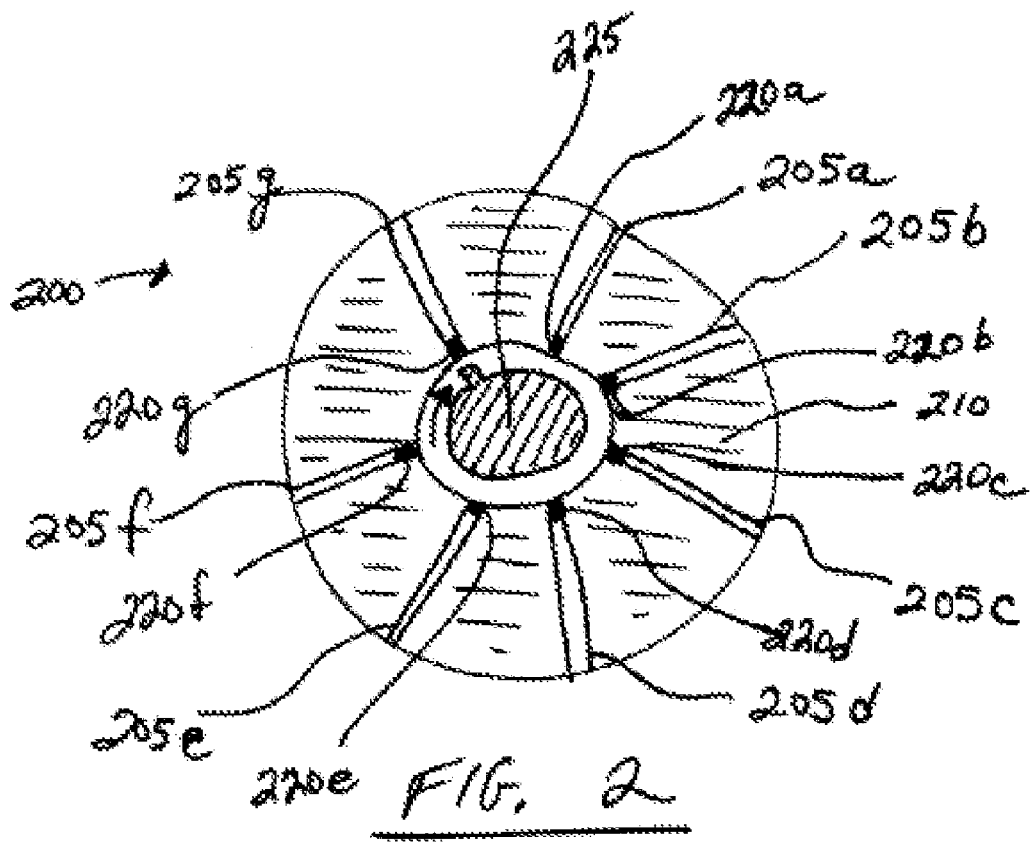
FIG. 2 is a cross-sectional view of a pulsed detonation engine assembly having a plurality of channels within a solid cylindrical body in accordance with one embodiment of the present invention.

As shown in FIG. 2, a PDE assembly 200 can have a plurality of channels 205a-205g drilled or molded into a solid body 210 at a variety of radial angles. The channels 205a-205g form the detonation chambers of the individual PDEs. The channels 205a-205g can be of any suitable dimensions, and even can be of micron size, e.g., as small as about 10 to 100 μm in diameter. Narrower channels generally provide for better cooling and improved containment of the detonation products. The propellant can be supplied to the center of the body 210 and injected into the channels 205a-205g. A plurality of igniters 220a-220g are provided in the channels 205a-205g proximate to the center of the ring or, alternatively, positioned at intermediate points along the walls of the channels 205a-205g. The ignition system can be integrated into the solid body 210.

A common (e.g., single) valve may control injection of the propellant into the plurality of channels. This enables each channel to have a reduced radius. The reduced-radius channels permit the detonation wave to propagate through the propellant to reach effective detonation velocities and pressures while maintaining containment of the detonation products. As schematically shown in FIG. 2, a rotatable valve 225 may be provided in the center portion of the solid body 210 to selectively inject propellant into the individual channels 205a-205g. Alternatively, a valve may be configured to simultaneously inject propellant into two or more channels 205a-205g. The small size of the channels 205a-205g permits the injection orifices of the individual channels to be selectively opened and closed using adaptive structure technology, such as piezoelectric, thermo-fluidic, electromagnetic, or solid state microelectronic mechanical (MEM) systems. The small size of the overall device enables other operations such as injection, ignition, and nozzle actuation to be implemented using a controller, such as the aforementioned piezoelectric, thermo-fluidic, electromagnetic, or microelectronic mechanical (MEM) systems.

Figure 3:
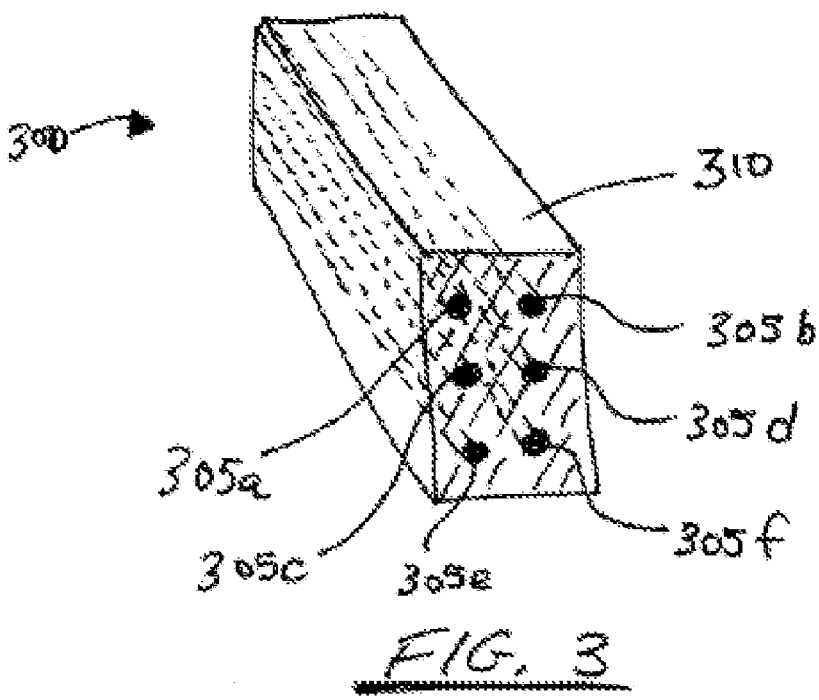
FIG. 3 is a perspective view of a pulsed detonation engine assembly having a plurality of channels within a solid body having a rectangular cross-section in accordance with an alternative embodiment of the invention.

FIG. 3 shows another embodiment of the invention in which a pulsed detonation engine assembly 300 is a solid elongate body 310 having a rectangular cross-section. The solid body 310 has a plurality of channels 305a-305f drilled or molded therein. The remaining details of the assembly 300 can be essentially as described above with respect to the embodiment of FIG. 2.

A wide variety of propellants can be used with the PDE of the present invention. Non-limiting examples include fuels detonable in mixtures with oxygen or other oxidizers such as hydrogen, methane, propane, acetylene, or propylene. Also, detonable mixtures of liquid fuels and oxidizer can be used, e.g., kerosene/oxidizer, alcohol/oxidizer, benzene/oxidizer and other similar mixtures. Detonable mono-propellants also can be used, such as nitromethane, nitroglycerin, or similar single-component propellants. Bi- and tri-propellant mixtures also can be used. In space applications, it may be advantageous to use detonable monopropellant such as nitromethane, nitroglycerin, hydrazine, or bipropellant such as $H_2O_2$/nitromethane or $H_2O_2$/kerosene. Other useful propellants include aluminum (solid or vapor), magnesium (solid or vapor), carbon, and boron. In general, the propellant can be solid, liquid, vapor, or multi-phase (e.g., dispersion of liquid particles).

In one embodiment, a mixture of tetranitromethane and nitrobenzene is used as propellant. The two components can be mixed over a range of ratios, but preferably the ratio is at or near stoichiometric, e.g., about 70/30 (tetranitromethane/nitrobenzene). In another embodiment, a mixture of tetranitromethane and toluene is employed as propellant. Mixtures of tetranitromethane and toluene are useful over a range of ratios, including, for example, a mixture of about 90/10 tetranitromethane/toluene.

The propellant and ignition system preferably are selected to permit small size implementation as well as operation of the PDE in vacuum or low pressure (e.g., as is encountered at high altitudes). Preferred propellants can be initiated by electric discharge in which the energy of discharge is less than about 5 J, and even as low as about 5 mJ or less.

An energy regeneration and storage device may be provided to permit remote operation of the PDE for extended periods of time. A regenerative ignition system may be employed in which high voltage electrical energy is produced by piezoelectric materials being activated by shock waves that are produced during detonation.

For vacuum operation, a restrictive and/or converging nozzle (not shown) may be provided to prevent the detonable mixture from escaping from the detonation chamber. When using liquid or multi-phase propellants having a low vapor pressure, the propellant may remain in liquid or liquid particle form, which may be more easy to contain in the detonation chamber due to lower average loading density of the propellant into the detonation chamber.

In accordance with one embodiment of the present invention, liquid propellants are used with a propellant loading density of from about 0.001 g/cc to about 0.5 g/cc. Propellant loading densities in this range should be particularly advantageous for RCS applications. One advantage is that excessively high pressures (e.g., on the order of 1 GPa typical of detonation) can be avoided. Such high pressures are undesirable because they can result in loss of containment of the detonation products as well as engine damage. Lowering propellant loading densities to values less than 0.5 g/cc can result in detonation products pressures not exceeding about 0.25 GPa. Such pressures both facilitate containment of detonation products and help avoid engine rupture.

A propellant-rich gas based on aluminum can be generated without the undesirable formation of an oxide layer. The aluminum particle size should be kept below 10 microns to maintain a sustained detonation. Aluminum also can be generated as a vapor, which will further enhance its detonability in the presence of a liquid or gaseous oxidizer. Magnesium can be generated as a solid or vapor suspension, and can be detonated with an oxidizer. The magnesium particles or droplets should be approximately 10 microns or less to detonate. Both aluminum and magnesium vapor suspensions have very favorable detonation properties. However, an undesirable property of the vapor suspensions is their tendency to condense on cold surfaces because of the relatively high melting points of the two metals. Condensation of aluminum and magnesium vapor can cause mechanical problems if it occurs on tightly fitting parts with small gap tolerances. Alternatively, the system can be heated by designing a gas generator propellant grain that first produces hot gas followed by the propellant-rich gases.

Nanoscale materials, such as aluminum or boron powder, can be mixed with a propellant to manipulate the properties of the propellant. In one aspect, nanoscale materials are added to a liquid propellant to activate the propellant. Nanoscale materials also may be used to reduce detonation velocity and pressure, which helps promote containment. In addition, nanoscale materials can be used to increase or decrease the dielectric properties of the propellant (to permit sparking to occur). Persons skilled in the art can determine the relative amount of nanoscale materials needed to alter the properties of the propellant as desired with the aid of no more than routine experimentation. The propellant activation effect generally occurs when using concentrations of nanoscale particles on the order of about 0.1 to 1 wt %, whereas reduction of the detonation velocity generally occurs when using nanoscale particle concentrations of about 1 to 15 wt %. Alternatively, the properties of the propellant can be modified using chemical additives.

Particles such as carbon structures, e.g., fullerines, nanotubes, and nanoscale diamond, can be used as propellant additives or as fuel. Also, in some cases nanoscale particles can absorb fuel on their surface, rendering the nanoscale particles detonable.

To ensure the optimum condition for propellant detonation, the fuel and oxidizer should be thoroughly mixed to ensure the fuel concentration is within the detonability limit (i.e., near stoichiometric). Mixing can be characterized on several levels including macroscopic and microscopic scales. Macroscopic mixing refers to the bulk fluid processes, which bring the fuel and oxidizer components to close proximity (e.g., impingement of fuel and oxidizer streams). Microscopic mixing is the process by which the fuel and oxidizer are further mixed to a length scale required for detonation. Many techniques can be employed to produce microscopic mixing.

The propellant can be injected into the detonation chamber, and ignited when it is in the dispersed phase. Detonation thus can be initiated when the dispersed propellant is not confined by the walls of the detonation chamber. This reduces the loading density (e.g., to about 1 g/cc) and pressure inside of the detonation chamber, which assist with containment. A groove (not illustrated) or other structure may be provided within the detonation chamber to contain or partially contain the injected propellant. The propellant may be partially contained in a groove, for example, so that upon detonation, the detonation products are allowed to rapidly expand laterally, thus reducing pressure in the chamber. Alternatively, the detonable mixture can be dispersed within a thin layer around the inside surface of the detonation chamber walls. The thin layer permits the detonation products to expand while limiting the detonation pressure reached, e.g., to avoid excessively large pressure or explosion.

Figure 4:
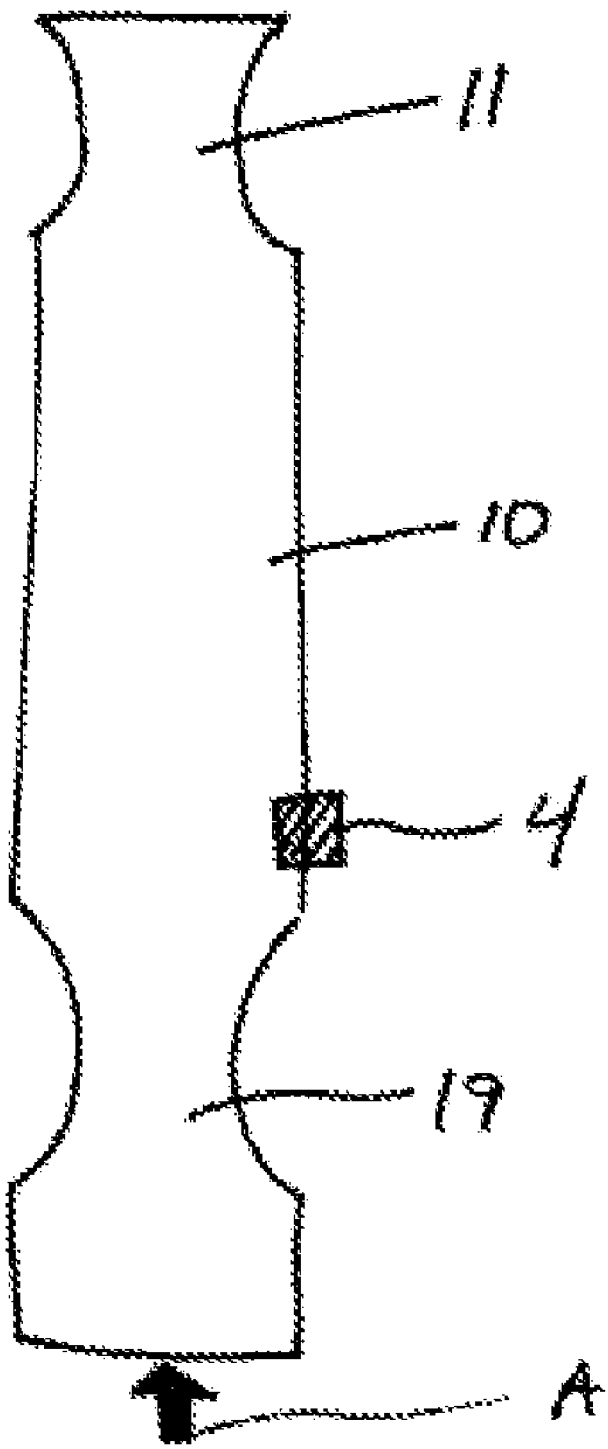
FIG. 4 is a schematic illustration of a pulsed detonation engine having a converging/diverging nozzle for injecting a propellant into the detonation chamber in accordance with an alternative embodiment of the invention.

As illustrated in FIG. 4, it may be advantageous to inject a gaseous, multi-phase, or liquid propellant (represented by arrow A) into the detonation chamber 10 with a converging/diverging nozzle 19 when the propellant is detonated with a pressure in the detonation chamber 10 that is larger than the pressure outside of the nozzle 19. The igniter 4 can be positioned along the wall of the detonation chamber 10, e.g., downstream of the point of propellant injection.

Several methods for initiating a detonation cycle may be used. Detonation may be initiated by igniting a fuel-oxygen mixture in a small detonation tube (not illustrated) that discharges into the detonation chamber, or by igniting a fuel-oxygen mixture collocated within the detonation chamber. Alternatively, a high voltage electric discharge or pyrotechnic igniter can be used. The small detonation tube method generally requires fuel, an oxidizer, pumps, high-speed fluid valves, an electronic controller, a power supply and a spark generator. The direct electric discharge method generally requires a spark plug, an electronic controller and a power supply. Laser ignition can be used, where a laser produces a high-energy beam initiating detonation of propellant in the detonation chamber.

In one embodiment of the present invention, relatively low detonation velocities, e.g., from about 1 to 5 km/s, are employed. Conventional detonation velocities range from about 6 to 8 km/s. Various techniques may be used for controlling detonation velocities. One technique for limiting detonation velocity is selecting a detonation chamber geometry to limit the detonation wave propagation. Another technique is to provide additives to liquid propellants that will reduce detonation wave velocity and pressure. Yet another technique is selecting a propellant that provides relatively low pressure of detonation products.

The PDE of the present invention can be used alone or in combination with one or more additional PDEs for generating thrust. The thrust generated during the interval of operation, as previously described, is particularly useful in various applications reaction control systems, such as orbital control for earth-orbiting satellites. The PDE may be mounted onto a satellite such that its operation produces thrust in a particular direction or vector. Optionally, the PDE is mounted onto a robotic device, which enables the PDE to be rotated along one or more axes to vary the direction of thrust. Two or more PDEs can be actuated simultaneously or sequentially.

Simultaneous actuation of multiple PDEs can be used, for example, to increase the total amount of thrust generated during an interval of operation or to generate thrust vector in a particular direction. Sequential actuation of two or more PDEs may be desirable in cases where a longer period of thrust is needed. For example, a first PDE can be actuated for a first interval and then cooled for a period during which operation of a second PDE for a second interval continues thrust generation. If even longer periods of thrust are needed, the first and second (and possibly additional) PDEs can be operated cyclically for extended periods of thrust generation.

Figure 5:
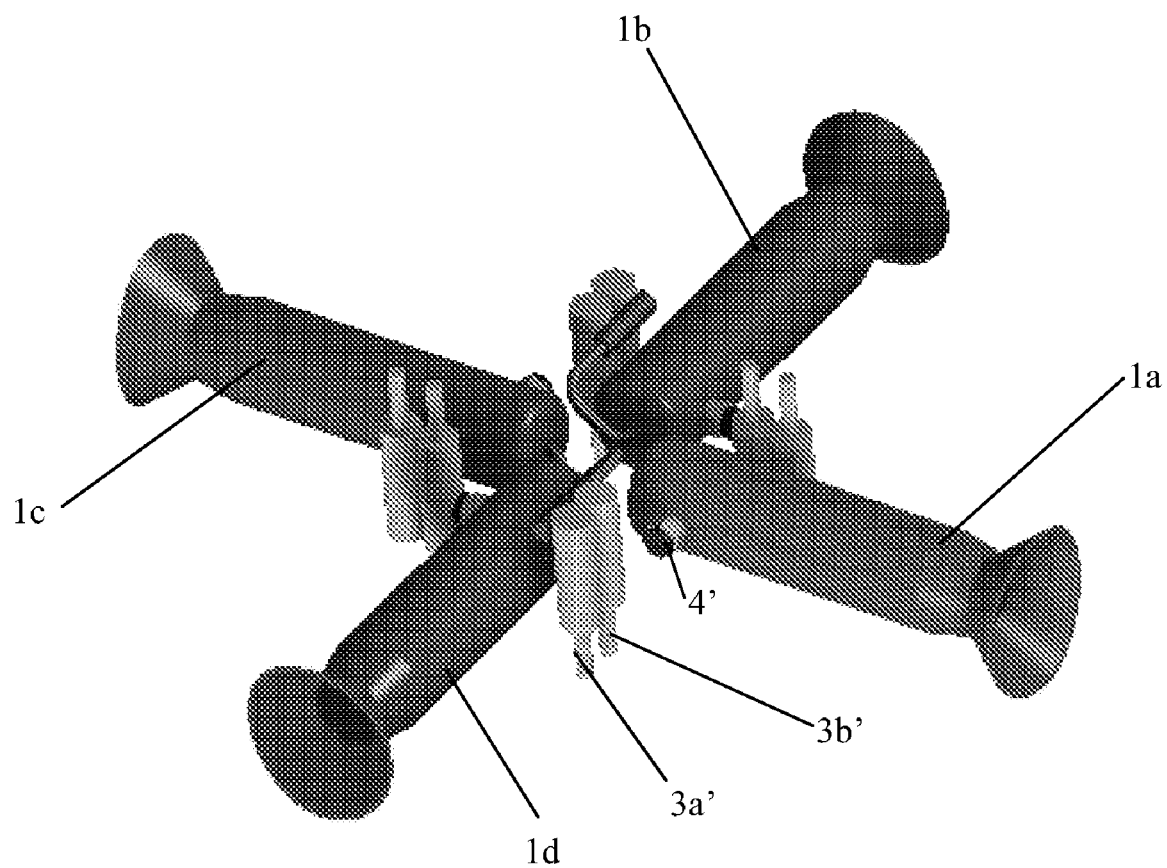
FIG. 5 is a schematic illustration of four PDEs assembled into cruciform forming a reaction control system (RCS) for generating thrust to induce spacecraft or missile motion in a required direction for spacecraft or missile motion control.

FIG. 5 illustrates four PDEs 1a, 1b, 1c, and 1d assembled into a cruciform, forming a reaction control system (RCS) for generating thrust, e.g., to induce motion of a spacecraft, missile, or other vehicle in a required vector. Each of the PDEs 1a, 1b, 1c, and 1d includes electronically controlled propellant valves 3a' and 3b', an igniter 4', and other features as previously described.

Figure 6A:
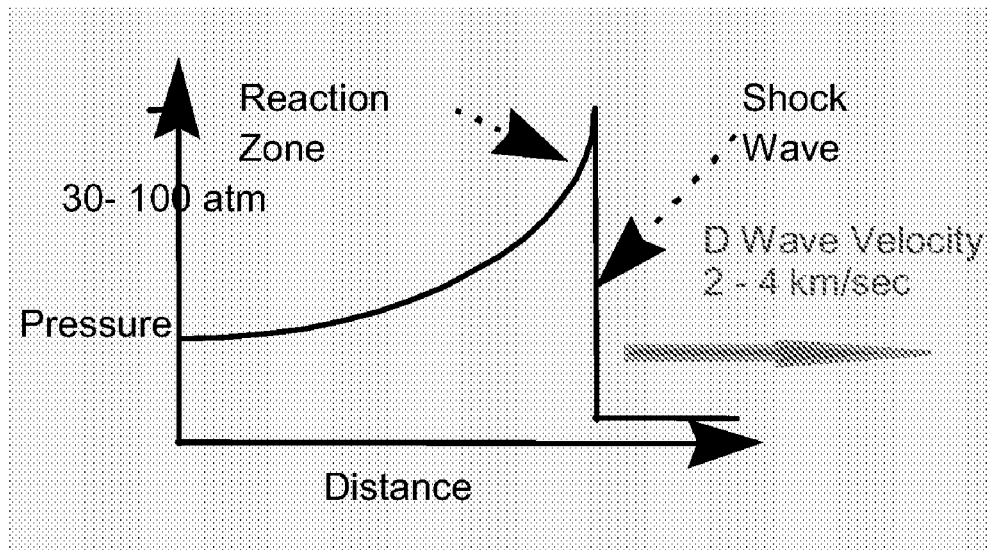
FIGS. 6A-6B are graphical illustrations of typical detonation waveform and thrust as a function of time.
Figure 6B:
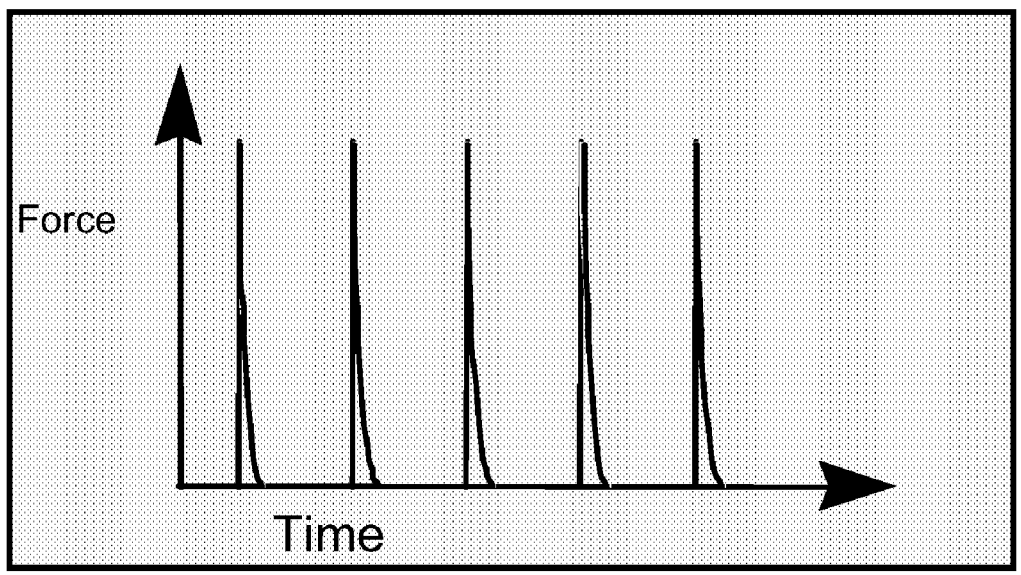

FIGS. 6A and 6B illustrate pressure distribution of a detonation wave propagating through the detonation chamber. The detonation wave travels at a velocity of about 2 km/sec. Thrust is produced when the pressure on the thrust wall and nozzle is higher than the ambient pressure and is generated continuously until the rarefaction wave arrives from the aft end of the engine and reduces the pressure to negligible levels. The force produced by detonation can be calculated by direct integration of the pressure over the projections of the internal and external surfaces of the engine onto the plane normal to the direction of motion.

Figure 7A:
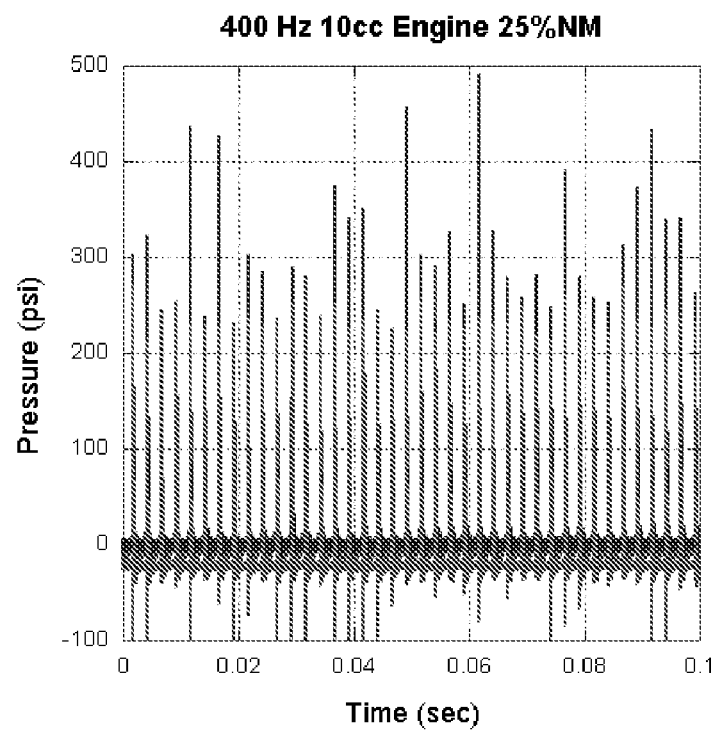
FIGS. 7A-7B are graphical illustrations of pressure time history for 400 Hz operation with the distance between transducers at 2.5 cm and detonation wave velocity of about 2 km/sec.
Figure 7B:
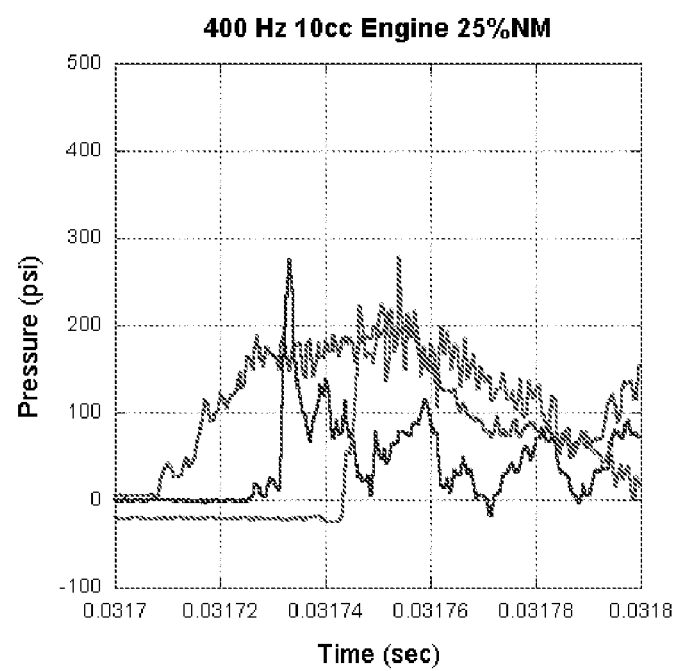

In FIGS. 7A and 7B, it can be observed that low initial pressure in the detonation chamber allows injection of detonable liquids directly from the propellant tank without the need of a compressor as is used in conventional rocket systems to raise the injection pressure to the pressure in the combustion chamber (usually to about 1,000-10,000 psi). In FIGS. 7A and 7B, pressure time histories for pressure transducers located at 2.5 cm, 5 cm, and 7.5 cm from the injection points are shown. FIG. 7A shows the pressure record for a 0.1 sec interval when the engine was operated at 400 Hz (the pressure spikes correspond to detonation every 2.5 msec). The variation of the peak pressure value in FIG. 7A is a measurement artifact related to construction of the pressure transducers. FIG. 7B shows a 0.1 msec interval, showing pressure for a single detonation. FIGS. 7A and 7B illustrate very regular engine operation at high frequency. Measurement of time between the shock waves in FIG. 7B shows that a fully developed, 2 km/sec detonation wave propagates through the mixture. This device generates thrust in 400 bits per second with about 15 millinewton per bit. The duration of the bit impulse is about 0.2 msec.

Figure 8:
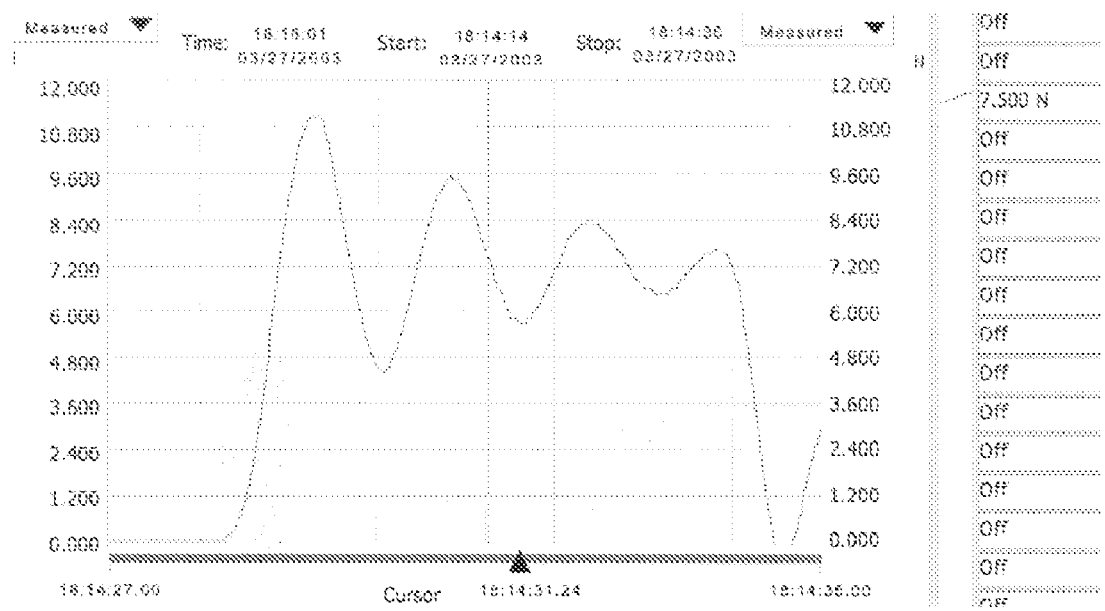
FIG. 8 is a graphical illustration of thrust measured using a pendulum test cell.

In FIG. 8, thrust as a function of time is shown for 400 Hz frequency operation. This record is produced by a calibrated gonionometer that records the thrust produced by the engine attached to the pendulum.

Figure 9:
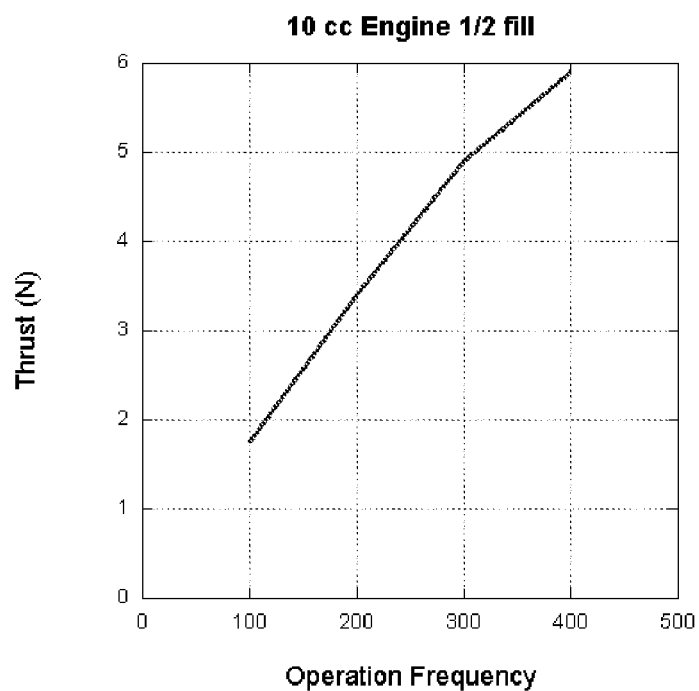
FIG. 9 is a graphical illustration of thrust as a function of engine operation frequency.

In FIG. 9, thrust as a function of detonation frequency is shown for the test regime when only half of the engine volume was filled with the propellant. FIG. 9 shows that thrust is a direct function of frequency.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A reaction control system for controlling motion of a vehicle, the reaction control system comprising:
   at least one pulsed detonation engine comprising one or more propellant valves, an igniter, a detonation chamber, and a nozzle;
   wherein the at least one pulsed detonation engine is adapted to controllably ignite detonation of a propellant to generate thrust in a predetermined vector for controlling motion of said vehicle.

2. The reaction control system of claim 1 which comprises a plurality of pulsed detonation engines capable of generating thrust in a plurality of vectors.

3. The reaction control system of claim 2 further comprising a controller for controlling operation of said plurality of pulsed detonation engines, wherein the controller is selected from the group consisting of a piezoelectric device, a thermofluidic device, a microelectronic mechanical system, an electromagnetic system, and combinations thereof.

4. The reaction control system of claim 1 wherein said at least one pulsed detonation engine comprises a detonation chamber having an igniter positioned downstream of a point at which propellant is injected.

5. The reaction control system of claim 1 wherein said at least one pulsed detonation engine comprises an igniter selected from the group consisting of a spark plug, a pyrotechnic device, and a laser.

6. The reaction control system of claim 1 further comprising an electrical energy regeneration and storage device capable of permitting remote operation of said at least one pulsed detonation engine for extended periods of time.

7. A vehicle comprising the reaction control system of claim 1.

8. A reaction control system for controlling the motion of a missile or other vehicle, the reaction control system comprising:
   at least four pulsed detonation engines arranged in a cruciform for selectively generating thrust in at least four vectors, wherein each of said pulsed detonation engines comprises electronically controlled propellant valves, an igniter, a detonation chamber, and a nozzle;
   a controller for selectively actuating said at least four pulsed detonation engines, the controller comprising at least one of a piezoelectric device, a thermo-fluidic device, an electromagnetic device, and a microelectronic mechanical system.

9. A missile comprising the reaction control system of claim 8.

10. The reaction control system of claim 1 which is a thruster for orbital correction and control of an earth-orbiting satellite.

11. The reaction control system of claim 1 which provides divert thrust generation and control for a space-based interceptor device.

12. The reaction control system of claim 1 which provides trajectory correction and motion control of a missile.

* * * * *